(12) United States Patent
Liao

(10) Patent No.: US 7,237,632 B2
(45) Date of Patent: Jul. 3, 2007

(54) POWERED MECHANISM FOR UNIVERSAL GOLF CART

(75) Inventor: Gordon Liao, Yung Kang (TW)

(73) Assignee: Unique Product + Design Co., Ltd, Yung Kang (TW)

( * ) Notice: Subject to any disclaimer, the term of this patent is extended or adjusted under 35 U.S.C. 154(b) by 0 days.

(21) Appl. No.: 11/247,915

(22) Filed: Oct. 11, 2005

(65) Prior Publication Data
US 2007/0080002 A1    Apr. 12, 2007

(51) Int. Cl.
*B62D 51/04* (2006.01)
(52) U.S. Cl. ............ 180/19.3; 180/68.5; 180/65.5
(58) Field of Classification Search .......... 280/DIG. 6, 280/DIG. 5; 180/65.1, 65.5, 193, 216, 19.3, 180/19.1, 19.2, 6.48, 315, 332, 333, 65.8
See application file for complete search history.

(56) References Cited

U.S. PATENT DOCUMENTS

| | | | | |
|---|---|---|---|---|
| 3,648,795 A | * | 3/1972 | Moulton | 180/216 |
| 3,719,247 A | * | 3/1973 | Hollis | 180/19.3 |
| 4,081,047 A | * | 3/1978 | Lovell et al. | 180/19.3 |
| 4,538,696 A | * | 9/1985 | Carter | 180/19.3 |
| 4,974,693 A | * | 12/1990 | Nakai et al. | 180/19.3 |
| 5,161,635 A | * | 11/1992 | Kiffe | 180/19.3 |
| 5,180,023 A | * | 1/1993 | Reimers | 180/19.1 |
| 5,375,673 A | * | 12/1994 | McCall et al. | 180/13 |
| 5,540,296 A | * | 7/1996 | Strothmann | 180/19.3 |
| 5,853,346 A | * | 12/1998 | Gaffney | 475/346 |
| 6,659,208 B2 | * | 12/2003 | Gaffney et al. | 180/19.2 |

* cited by examiner

*Primary Examiner*—Hau Phan
(74) *Attorney, Agent, or Firm*—Alan Kamrath; Kamrath + Associates PA

(57) ABSTRACT

A powered mechanism for a universal golf cart includes a transmission device, and a fixing device. The transmission device includes a housing assembly for mounting a motor, a battery unit, a control circuit board and a drive shaft. The drive shaft is connected with a wheel of the golf cart. The fixing device has a first portion secured to a foot tube of the golf cart and a second portion mounted on the drive shaft. Thus, the powered mechanism converts a traditional powerless golf cart into a motorized golf cart easily and rapidly.

14 Claims, 6 Drawing Sheets

US 7,237,632 B2

POWERED MECHANISM FOR UNIVERSAL GOLF CART

BACKGROUND OF THE INVENTION

1. Field of the Invention

The present invention relates to a powered mechanism for a universal golf cart, and more particularly to a powered mechanism for converting a traditional powerless golf cart into a motorized golf cart, thereby enhancing the versatility of the golf cart, and thereby preventing incurring waste of the resource.

2. Description of the Related Art

A powerless golf cart usually includes a push-type golf cart and a pull-type golf cart that are driven in two different directions. A conventional powerless pull-type golf cart in accordance with the prior art shown in FIG. 6 comprises a main frame 1, a handlebar 11, an upper bag support bracket 12, a lower bag support bracket 13, two foot tubes 2, and two rear wheels 22. The two rear wheels 22 are attached to the two foot tubes 2 by two wheel fasteners 21. A conventional powerless push-type golf cart in accordance with the prior art shown in FIG. 6 further comprises a front wheel 14. A motorized golf cart includes a powerless golf cart co-operating with a motor, a battery unit, a control circuit board and a hand controlled switch, thereby saving the user's manual work. However, the user has to buy a new golf cart (the motorized golf cart), so that the original powerless golf cart is useless, thereby decreasing the versatility of the golf cart, and thereby easily incurring waste of the resource.

SUMMARY OF THE INVENTION

In accordance with the present invention, there is provided a powered mechanism for a universal golf cart, comprising a transmission device, and a fixing device. The transmission device includes a housing assembly for mounting a motor, a battery unit, a control circuit board and a drive shaft. The drive shaft is connected with a wheel of the golf cart. The fixing device has a first portion secured to a foot tube of the golf cart and a second portion mounted on the drive shaft. Thus, the powered mechanism converts a traditional powerless golf cart into a motorized golf cart easily.

The primary objective of the present invention is to provide a powered mechanism for converting a traditional powerless golf cart into a universal motorized golf cart, thereby enhancing the versatility of the golf cart, and thereby preventing incurring waste of the resource.

Another objective of the present invention is to provide a powered mechanism for a universal golf cart, wherein the traditional powerless push-type or pull-type golf cart is converted into the motorized golf cart easily and rapidly, thereby facilitating a user mounting the motorized golf cart.

A further objective of the present invention is to provide a powered mechanism for a universal golf cart, wherein the fixing device of the powered mechanism has angle and distance adjustable functions, so that the powered mechanism is available for all kinds of traditional powerless golf carts, thereby enhancing the versatility of the powered mechanism.

Further benefits and advantages of the present invention will become apparent after a careful reading of the detailed description with appropriate reference to the accompanying drawings.

DETAILED DESCRIPTION OF THE INVENTION

Figure 1:
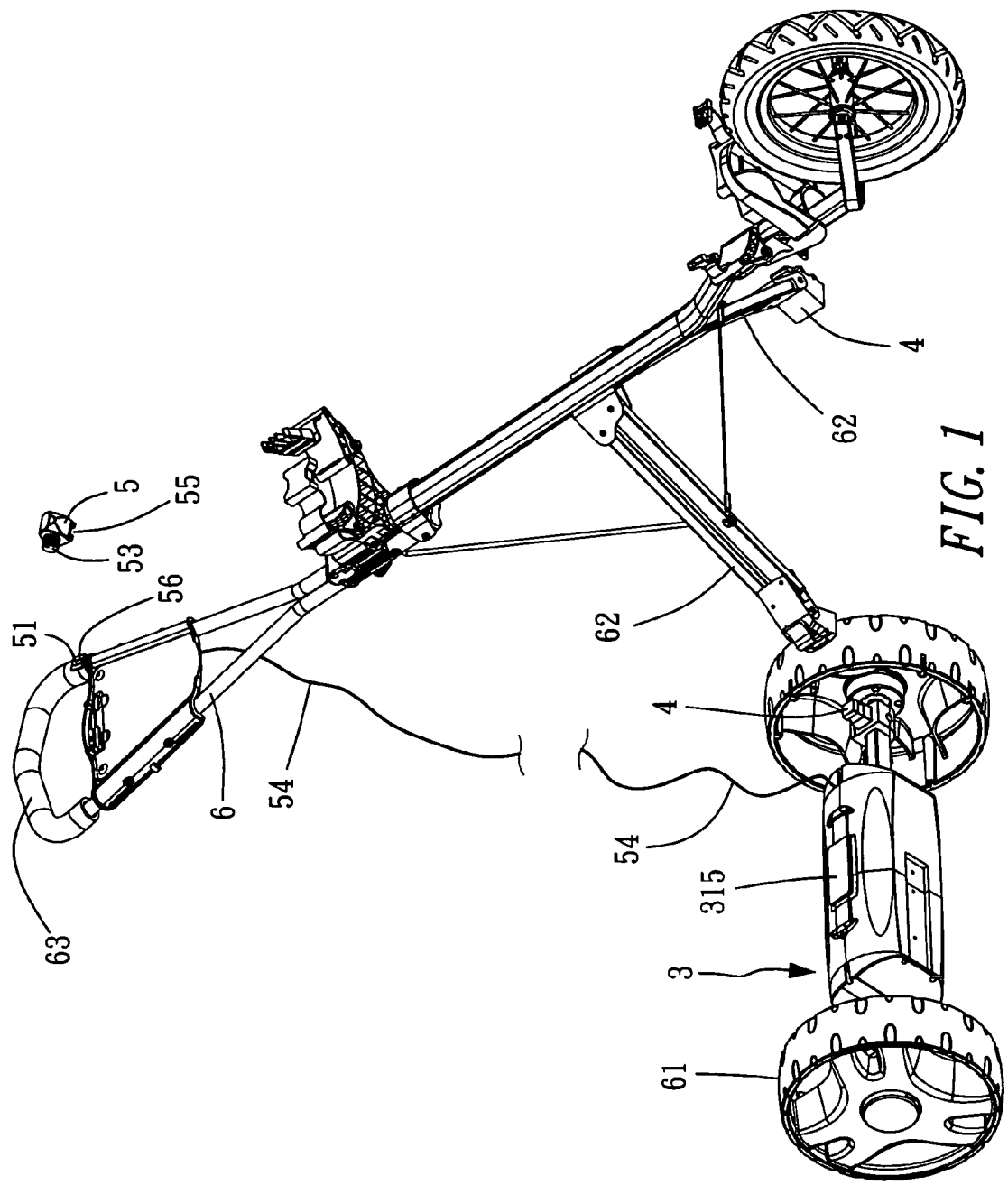
FIG. 1 is a partially perspective view of a powered mechanism for a universal golf cart in accordance with the preferred embodiment of the present invention.

Referring to the drawings and initially to FIG. 1, a powered mechanism for a universal golf cart in accordance with the preferred embodiment of the present invention comprises a transmission device 3, and a fixing device 4.

Figure 2:
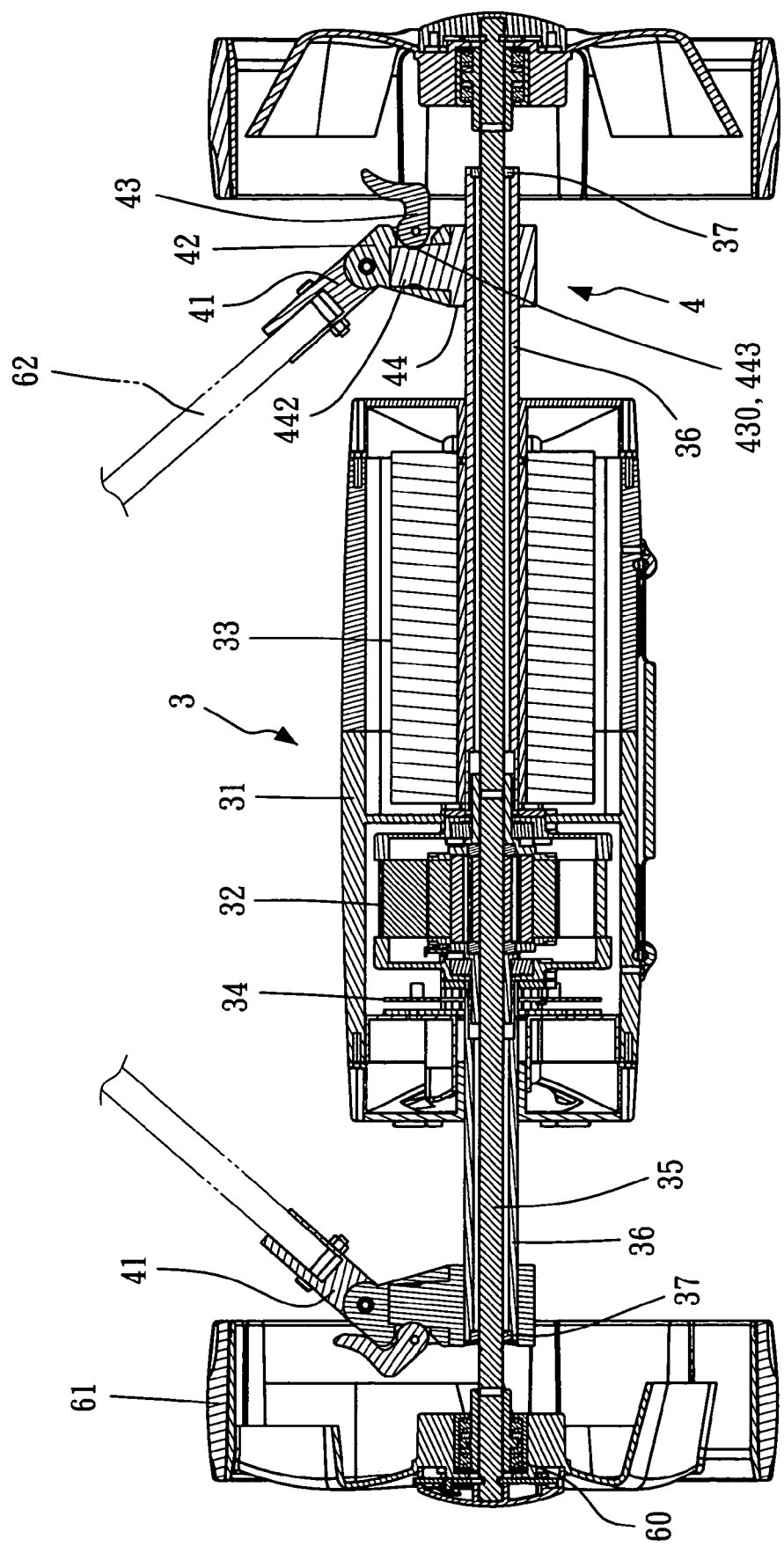
FIG. 2 is a partially plan cross-sectional view of the powered mechanism for a universal golf cart as shown in FIG. 1.
Figure 3:
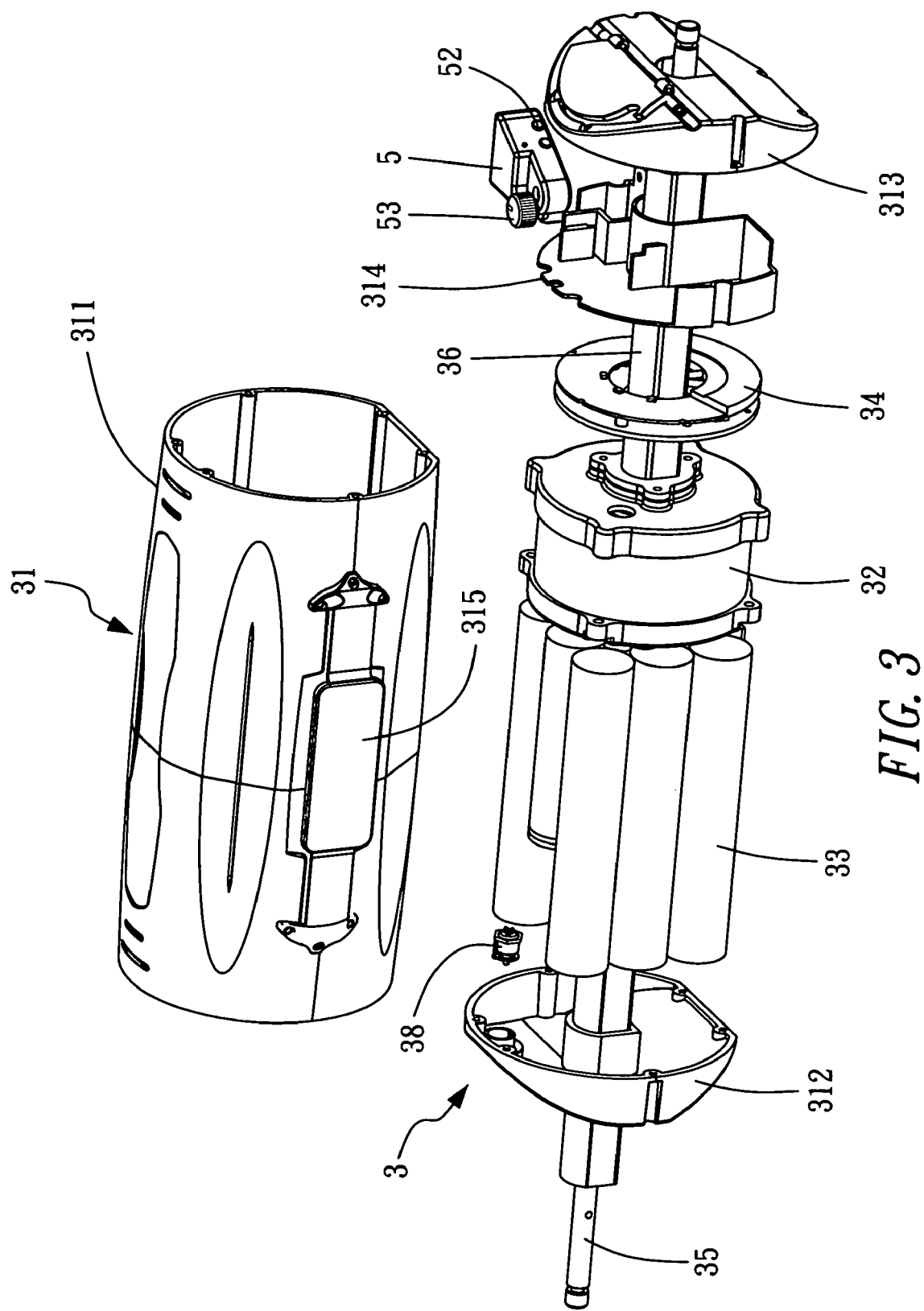
FIG. 3 is a partially exploded perspective view of the powered mechanism for a universal golf cart as shown in FIG. 1.
Figure 4:
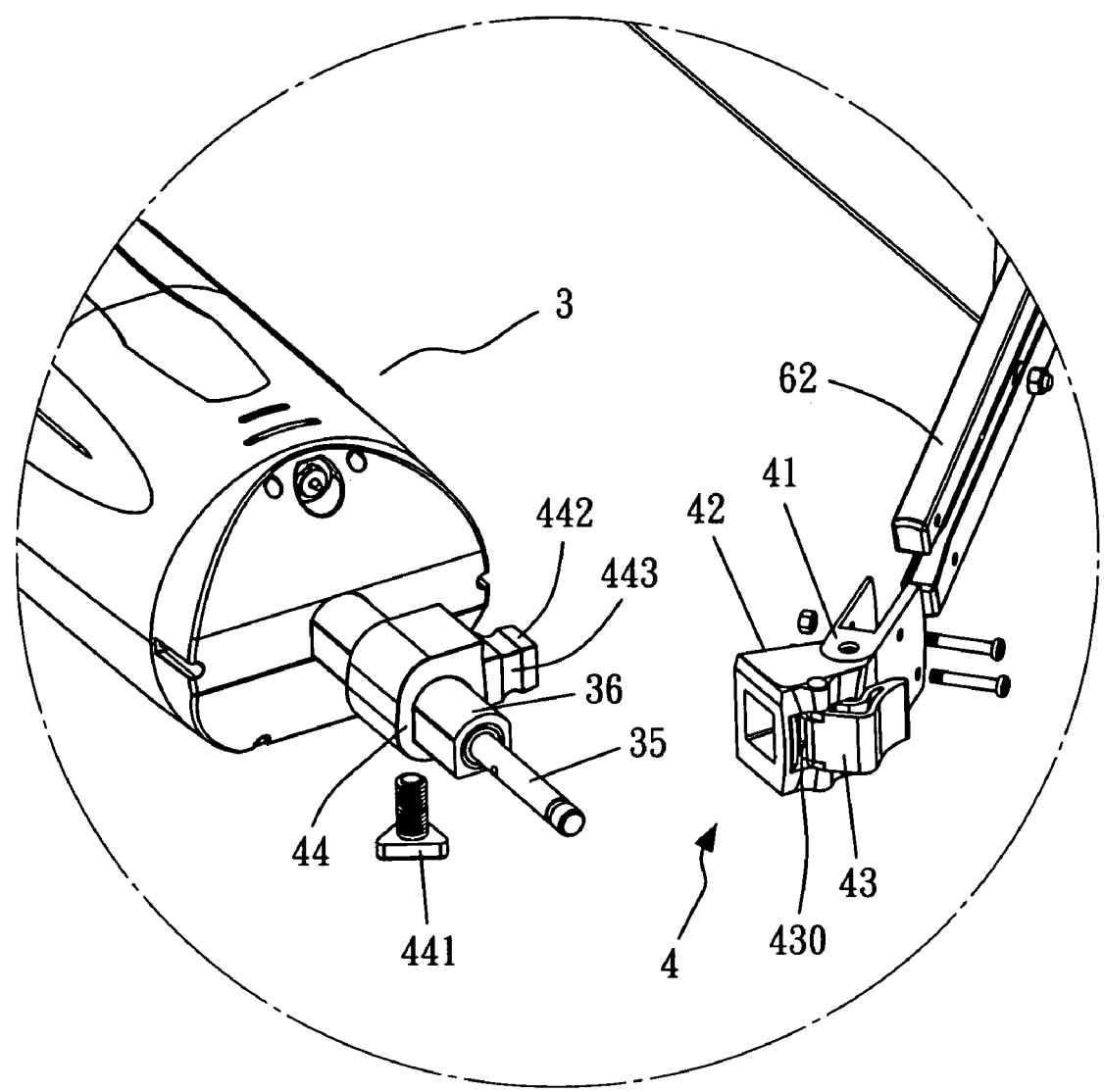
FIG. 4 is a partially exploded perspective view of the powered mechanism for a universal golf cart as shown in FIG. 1.
Figure 5:
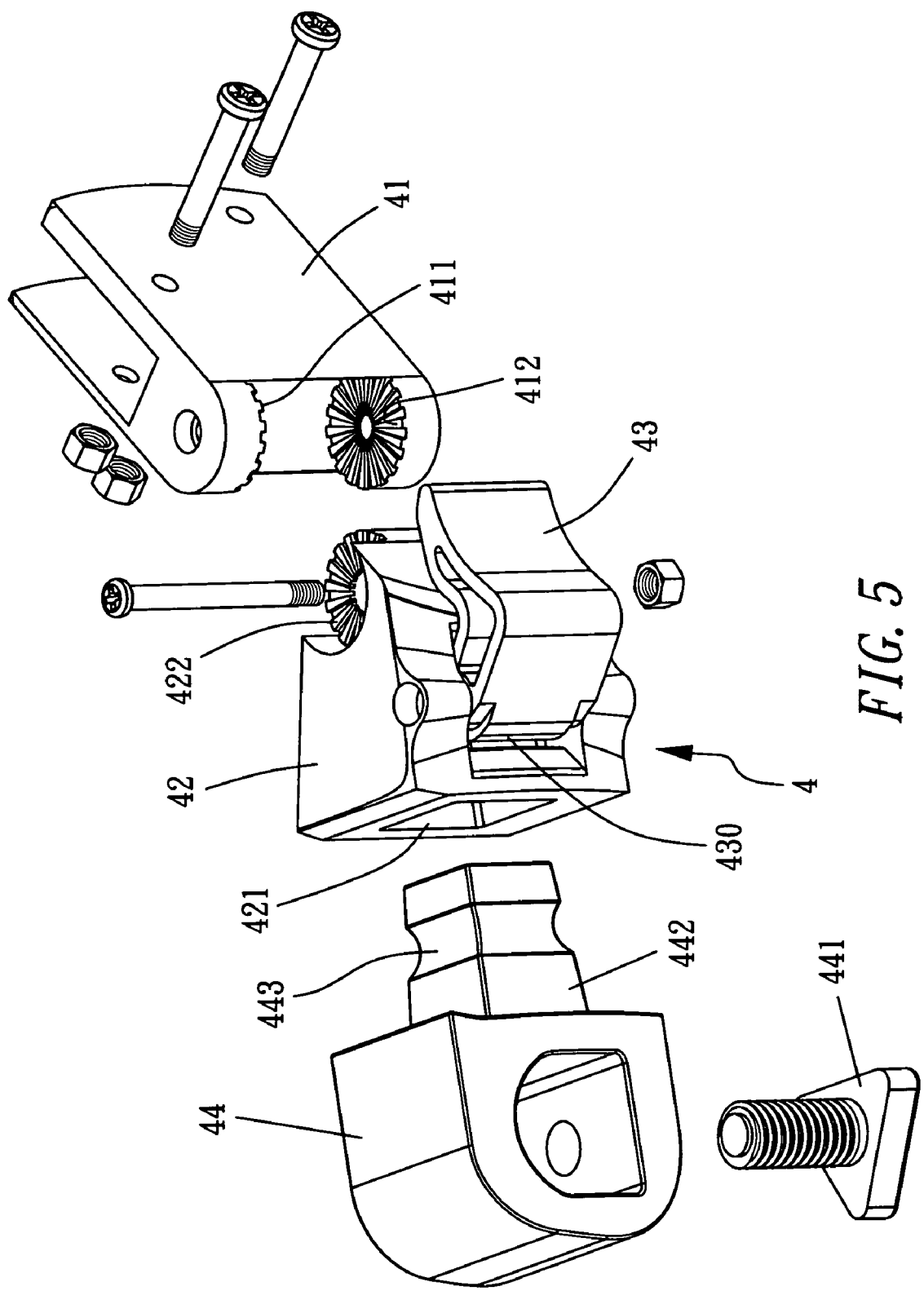
FIG. 5 is a locally enlarged view of the powered mechanism for a universal golf cart as shown in FIG. 4.

Referring to FIGS. 1–3, the transmission device 3 includes a housing assembly 31, a motor 32, a battery unit 33, a control circuit board 34, and a drive shaft 35. The housing assembly 31 includes a housing body 311, a left side cover 312, a right side cover 313, and a separation board 314 which are combined with each other by screws, so that the motor 32, the battery unit 33 and the control circuit board 34 are mounted in the housing assembly 31. The housing body 311 has an outside provided with a handle portion 315 to facilitate a user carrying the housing assembly 31. The left side cover 312 is provided with a charging seat 38, and a hand controlled switch 5 is mounted and stored between the right side cover 313 and the separation board 314. The drive shaft 35 is extended through the motor 32 and driven by the motor 32. The motor 32 has two sides each provided with a protective jacket 36. The protective jacket 36 has a distal end provided with a bearing 37 for fixing the drive shaft 35. The drive shaft 35 has two ends each connected with a wheel 61 of the golf cart so that the wheel 61 is driven by the drive shaft 35. The wheel 61 of the golf cart has a oneway clutch 60 mounted on the drive shaft 35.

Referring to FIGS. 1–5, the fixing device 4 has a first portion secured to a foot tube 62 of the golf cart and a second portion mounted on the protective jacket 36 of the drive shaft 35.

The fixing device 4 includes a foot tube fastener 41, an angle adjustment fixing block 42, a locking lever 43, and a movable block 44.

The foot tube fastener 41 is secured to the foot tube 62 of the golf cart by screws and has an end portion provided with an upper toothed disk 411 and a lower toothed disk 412 spaced from the upper toothed disk 411.

The angle adjustment fixing block 42 has a first end provided with a toothed disk 422 meshing with the upper toothed disk 411 and the lower toothed disk 412 of the foot tube fastener 41 and a second end formed with a receiving chamber 421. The toothed disk 422 of the angle adjustment fixing block 42 has toothed top and bottom faces meshing with the upper toothed disk 411 and the lower toothed disk 412 of the foot tube fastener 41 respectively to adjust the angle between the foot tube 62 of the golf cart and the drive shaft 35. In addition, the upper toothed disk 411 and the lower toothed disk 412 of the foot tube fastener 41 and the toothed disk 422 of the angle adjustment fixing block 42 are fixed by screws.

The locking lever 43 is eccentrically and pivotally mounted on a side of the angle adjustment fixing block 42 and has a locking end 430 extended into the receiving chamber 421 of the angle adjustment fixing block 42.

The movable block 44 is slidably mounted on the protective jacket 36 (or the drive shaft 35) so as to adjust the distance between the foot tubes 62 at the two sides of the golf cart. The movable block 44 is fixed by a positioning bolt 441. The movable block 44 has an end portion provided with a protruding shaft 442 extended into the receiving chamber 421 of the angle adjustment fixing block 42 and formed with an annular locking groove 443 locked on the locking end 430 of the locking lever 43, so that the movable block 44 is detachably secured to the angle adjustment fixing block 42.

Figure 6:
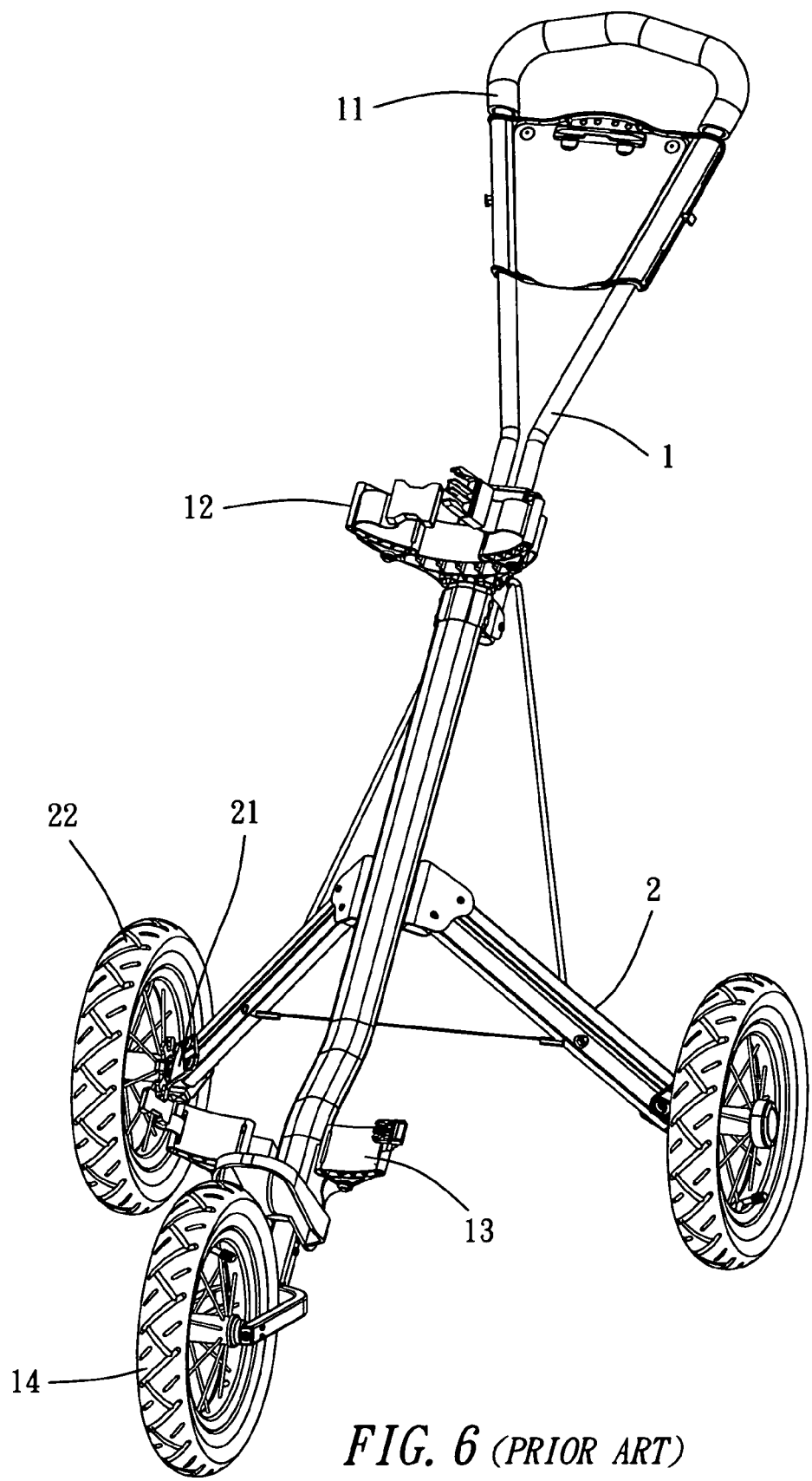
FIG. 6 is a perspective view of a conventional powerless golf cart in accordance with the prior art.

When the powered mechanism is mounted on a traditional powerless push-type golf cart as shown in FIG. 6, the wheel fasteners 21 at the two rear wheels 22 of the traditional powerless push-type golf cart are detached and are replaced by the fixing devices 4. In assembly, the foot tube fastener 41 (together with the angle adjustment fixing block 42 and the locking lever 43) of the fixing device 4 is secured to the foot tube 62 of the golf cart, and the movable block 44 of the fixing device 4 is mounted on the protective jacket 36 of the transmission device 3. At this time, the angle between the angle adjustment fixing block 42 and the foot tube fastener 41 is adjusted, and the position of the movable block 44 is adjusted to correspond to the angle and distance between the foot tubes 62 at the two sides of the golf cart. Thus, the powered mechanism is mounted on the traditional powerless push-type golf cart as shown in FIG. 2. After assembly, the power supply (not shown) is turned on to drive the control circuit board 34 by the transmission device 3 so as to control the golf cart as shown in FIG. 1 to move by a remote controller (not shown).

As shown in FIGS. 1 and 3, a switch base 51 is mounted on a handlebar 63 of a main frame 6 of the golf cart for mounting the hand controlled switch 5 which is removed from the transmission device 3. The switch base 51 has rails 56, and the hand controlled switch 5 has a bottom formed with a dovetailed groove 55 fixed on the rails 56 of the switch base 51 so that the hand controlled switch 5 is fixed on the switch base 51. The hand controlled switch 5 is provided with a power switch 52 and a speed control button 53. The hand controlled switch 5 and the control circuit board 34 are connected by a transmission wire 54, so that a user can operate the hand controlled switch 5 to supply a control signal to the control circuit board 34 so as to control the power output of the motor 32.

At this time, the power switch 52 is turned on, and the speed control button 53 is adjusted, so that the traditional powerless push-type golf cart as shown in FIG. 6 is converted into the motorized golf cart as shown in FIG. 1.

It is appreciated that, the traditional powerless golf cart includes a push type golf cart and a pull type golf cart that are driven in two different directions. When the powered mechanism is mounted on a traditional powerless pull-type golf cart, the transmission device 3 is rotated through 180 degrees after the fixing device 4 is fixed, and is then connected with the fixing device 4, so that the transmission device 3 can drive the wheels 61 in the opposite direction without having to change the inner motorized mechanism or the electronic control program.

Accordingly, the traditional powerless push-type or pull-type golf cart is converted into the motorized golf cart easily and rapidly, thereby facilitating a user mounting the motorized golf cart. In addition, the fixing device 4 of the powered mechanism has angle and distance adjustable functions, so that the powered mechanism is available for all kinds of traditional powerless golf carts, thereby enhancing the versatility of the powered mechanism.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A powered mechanism for a universal golf cart, comprising:
   a transmission device including a housing assembly for mounting a motor, a battery unit, a control circuit board and a drive shaft, wherein the drive shaft is connected with a wheel of the golf cart;
   a fixing device having a first portion secured to a foot tube of the golf cart and a second portion mounted on the drive shaft;
   wherein the powered mechanism converts a traditional powerless golf cart into a motorized golf cart easily;
   the housing assembly includes a housing body, a left side cover, a right side cover, and a separation board which are combined with each other by screws;
   the motor is mounted in the housing assembly;
   the battery unit is mounted in the housing assembly;
   the control circuit board is mounted in the housing assembly;
   the drive shaft is extended through the motor and driven by the motor, the drive shaft has two ends each connected with the wheel of the golf cart so that the wheel is driven by the drive shaft;
   the motor has two sides each provided with a protective jacket, the protective jacket has a distal end provided with a bearing for fixing the drive shaft.

2. The powered mechanism for a universal golf cart in accordance with claim 1, wherein the housing body has an outside provided with a handle portion to facilitate a user carrying the housing assembly.

3. The powered mechanism for a universal golf cart in accordance with claim 1, further comprising a hand controlled switch mounted on a handlebar of a main frame of the golf cart, wherein the hand controlled switch is connected to the control circuit board by a transmission wire.

4. The powered mechanism for a universal golf cart in accordance with claim 3, further comprising a switch base mounted on the handlebar of the main frame of the golf cart for mounting the hand controlled switch.

5. The powered mechanism for a universal golf cart in accordance with claim 4, wherein the switch base has rails, and the hand controlled switch has a bottom formed with a dovetailed groove fixed on the rails of the switch base so that the hand controlled switch is fixed on the switch base.

6. The powered mechanism for a universal golf cart in accordance with claim 3, wherein the hand controlled switch is mounted and stored in the housing body.

7. The powered mechanism for a universal golf cart in accordance with claim 3, wherein the hand controlled switch is provided with a power switch and a speed control button.

8. A powered mechanism for a universal golf cart, comprising:

a transmission device including a housing assembly for mounting a motor, a battery unit, a control circuit board and a drive shaft, wherein the drive shaft is connected with a wheel of the golf cart;

a fixing device having a first portion secured to a foot tube of the golf cart and a second portion mounted on the drive shaft;

wherein the powered mechanism converts a traditional powerless golf cart into a motorized golf cart easily;

the fixing device includes:

a foot tube fastener secured to the foot tube of the golf cart;

an angle adjustment fixing block meshing with the foot tube fastener;

a locking lever pivotally mounted on a side of the angle adjustment fixing block;

a movable block mounted on the protective jacket of the drive shaft and fixed by a positioning bolt, the movable block has an end portion provided with a protruding shaft extended into the angle adjustment fixing block and locked by the locking lever, so that the movable block is detachably secured to the angle adjustment fixing block.

9. The powered mechanism for a universal golf cart in accordance with claim 8, wherein the foot tube fastener and the angle adjustment fixing block are provided with toothed disks meshing with each other to adjust the angle between the foot tube of the golf cart and the protective jacket of the drive shaft.

10. The powered mechanism for a universal golf cart in accordance with claim 8, wherein the foot tube fastener has an end portion provided with an upper toothed disk and a lower toothed disk spaced from the upper toothed disk, and the angle adjustment fixing block has a first end provided with a toothed disk meshing with the upper toothed disk and the lower toothed disk of the foot tube fastener.

11. The powered mechanism for a universal golf cart in accordance with claim 10, wherein the angle adjustment fixing block has a second end formed with a receiving chamber.

12. The powered mechanism for a universal golf cart in accordance with claim 11, wherein the locking lever is eccentrically mounted on the side of the angle adjustment fixing block and has a locking end extended into the receiving chamber of the angle adjustment fixing block.

13. The powered mechanism for a universal golf cart in accordance with claim 11, wherein the movable block has an end portion provided with a protruding shaft extended into the receiving chamber of the angle adjustment fixing block and formed with an annular locking groove locked on the locking end of the locking lever.

14. The powered mechanism for a universal golf cart in accordance with claim 8, wherein the movable block is slidably mounted on the protective jacket of the drive shaft.

* * * * *